UNITED STATES PATENT OFFICE.

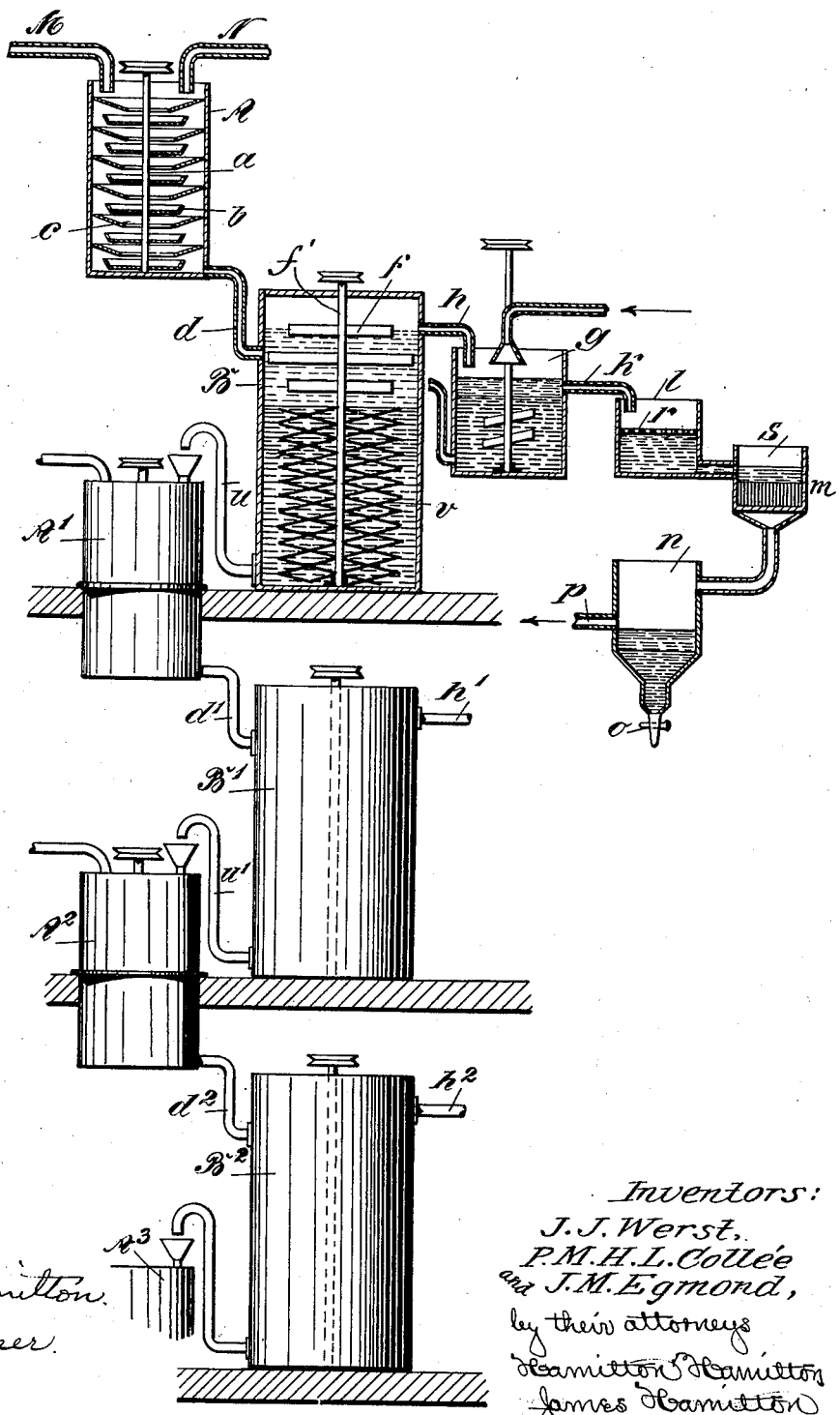

JOHANNES J. WERST, OF DELFT, AND PAUL M. H. L. COLLÉE AND JOHAN M. EGMOND, OF ROTTERDAM, NETHERLANDS.

PROCESS FOR SEPARATING FIBROUS MATTER FROM ADMIXTURES.

1,083,234. Specification of Letters Patent. Patented Dec. 30, 1913.

Application filed April 11, 1913. Serial No. 760,550.

*To all whom it may concern:*

Be it known that we, JOHANNES JACOBUS WERST, chemical engineer, PAUL MARIE HENRI LOUIS COLLÉE, manufacturer, and JOHAN MARTINUS EGMOND, the first and third subjects of the Queen of the Netherlands, the second a subject of the King of Belgium, the first residing at the city of Delft, in the Kingdom of the Netherlands, the second and third residing at the city of Rotterdam, in the Kingdom of the Netherlands, have invented certain new and useful Improvements in Processes of Separating Fibrous Matter from Admixtures, of which the following is a specification.

The object of the invention is to provide a novel process for separating fibrous waste material, such as waste paper, rags, sawdust, and the like, from foreign matter and impurities, in a more efficient and economical manner than heretofore.

The essential feature of the improved process consists in subjecting the fibrous matter, containing the admixtures, to the action of liquids of different specific weights, which are not miscible with each other, or only slightly so, and which have different degrees of affinity or attraction for the matter to be treated, one of the liquids employed tending to attract the foreign matter and the other the fibrous matter. For the purpose we may use two liquids only, or two or more mixtures of various liquids, the liquids being placed in a common vessel so that the fibrous matter will collect in one of the liquids and the foreign matter in the other liquid, this separation being assisted by agitating the liquids by stirring or shaking them. In certain cases it is necessary to subject the separating liquids or the fibrous matter or foreign matter to preliminary treatment in order to render them capable of treatment by the process. It has for example been found that certain pigments cannot, owing to their chemical composition, be separated from the fibers by the process without preliminary treatment, this applying particularly to mineral pigments. Thus, for example, paper printed with ink containing metallic salts may be treated with soluble sulfids, thiosulfates, or thionates, and the like. The particular mode and sequence of operations depend on the particular requirements in each case; for instance, the fibrous matter may be ground or not ground before being subjected to the preliminary treatment or the separating treatment. The separating liquids may consist on the one hand for example of aqueous liquids, diluted lyes, acids, solutions of salts having alkaline or acid reactions, etc., and on the other hand of oils or oily liquids, as for instance benzin, turpentine oil, paraffin oil, tetrachlorid of carbon, sulfid of carbon, ether, and the like, these liquids being used according to the particular purpose or according to the nature of material to be treated. For preliminary treatment of fibrous material, we prefer to boil the same under pressure in alkaline solutions, capable of dissolving such binding agents as may be present, freeing the fibrous matter of adhering foreign matter, and separating the fibers from one another. In connection with waste paper, alkaline sulfite solutions have been found particularly suitable for this purpose, inasmuch as they combine the dissolving power with bleaching power, and are also very inexpensive.

The following is an example of the use of the process in connection with waste paper, for the purpose of eliminating printing ink, size and the like, and enabling the cellulose to be used for the manufacturing of paper again: In the first instance the waste paper is boiled under pressure in a dilute solution of sulfite, as for instance sulfite of soda, so that the woody matter is converted into cellulose and a bleaching effect is produced, the effect of boiling under pressure being to accelerate the process and enable higher temperature to be employed without fear of the matter being disintegrated beyond the desired point by the development of steam bubbles which would render the subsequent washing more difficult. The mass is then washed until it gives neutral reaction and is ground, whereupon water is added thereto until a thin pulp with a low concentration of fibers is produced. This latter dilution may also be effected with a weakly acid liquid.

The figure in the drawing is illustrative of the apparatus it is proposed to employ.

The apparatus used comprises a plurality of emulsifying appliances A, A¹, etc., and separators B, B¹, etc., alternating with each other and arranged in series, so that the liquid containing the fibrous matter, passes from the first separator to the second emulsifying appliance, thence to the second separator and through the same to the third emulsifying apparatus and so forth, until the desired effect is obtained. Each emulsifying apparatus comprises a casing in the interior of which are mounted on a rotary spindle $a$ a number of superposed plates $b$ between which are disposed stationary dished plates or funnels $c$. This arrangement may be modified by making the plates $b$ stationary and the funnels $c$ rotary, or the plates and funnels may rotate in opposite directions. This motion of the plates or funnels or both subjects the thin pulp of fibrous matter, and the admixed benzin to centrifugal action, together with the dissolved admixtures and impurities, and produces an emulsion so that the smallest particles are brought into contact with the liquids. The mass flows from the apparatus A through the pipe $d$ to the separator B, in which a slowly revolving stirring device $f$ causes the specifically lighter liquid, in this case benzin, to rise, while the specifically heavier liquid, namely the liquid containing the fibers, descends. The benzin, containing the foreign matter, and floating at the top is drawn off through a pipe $h$, to another vessel $g$ into which runs a spray of water, this vessel serving to further separate any fibrous matter carried over by the benzin; a slowly rotating stirring device in the vessel $g$ causes the fibers to sink, the benzin at the top being conducted by a pipe $k$ to another vessel $l$ containing a sieve $r$ of fine mesh. Such sieve serves to collect any fibrous matter still present, but allows the benzin to flow through a pipe level with the bottom of the vessel $l$ into a vessel $s$ provided with a filter $m$, preferably of charcoal, the liquid passing therefrom into a vessel $n$ in which the benzin and water are separated, the benzin flowing out through a pipe $p$ and the water being drawn off at the base through a tap $o$.

In the separator, hereinbefore described, the specifically lighter liquid is separated from the specifically heavier liquid containing the fibrous matter, the latter being kept in slow movement by the slowly rotating stirring device $f$. In the lower part of the vessel B are a large number of thin pins $v$ which are secured to and project from the periphery of the shaft $f^1$, such pins serving to accelerate the separation of the liquids by agitating the fiber particles, and allowing the specifically lighter liquid to ascend. The liquid containing the fibrous matter is then fed by a pipe $u$ to the second emulsifying apparatus $A^1$ and thence to the separator $B^1$ whence the gradually more and more purified fibrous mass is fed through the emulsifying and separating appliances $A^2$ and $A^3$, by pipes $u^1$, $d^2$ until the paper fibers are free of all impurities. The stirrers $f$ and needles $v$ may be rotated by a common shaft or by two independent shafts. It is essential for efficient action of the separation that the stirrers $f$ and pins $v$ should rotate slowly in order that the liquids of specifically different weight may not again be mixed with one another.

What we claim as our invention is:

1. A sub-process of the process of separating fibrous matter from foreign admixtures, printers' ink, impurities and other foreign matter, comprising boiling the material in an alkaline sulfite solution; adding to the boiled material a substance immiscible therewith; and then forming an emulsion of the mass thereby obtained.

2. A process of separating fibrous matter from foreign admixtures, printers' ink, impurities and other foreign matter, comprising dissolving the binding medium by subjecting the material under treatment to the action of a suitable solution; adding to the material thus treated a substance immiscible therewith; emulsifying the mass thereby obtained by subjecting the same to centrifugal action; and slowly stirring the emulsion until the immiscible substance together with the foreign matter separates from the fibrous matter, said stirring being so slow as to preclude reëmulsification, while promoting the settling of the fibrous matter.

3. A subprocess of the process of separating fibrous matter from foreign admixtures, printers' ink, impurities and other foreign matter, comprising reducing the material under treatment to a pulp; adding to the pulp thus obtained a liquid substantially immiscible therewith; forming an emulsion of the pulp and the liquid substance added thereto; separating the fibrous matter from the emulsion by settling; promoting the settling action of the fibrous matter by stirring the mass so slowly as to preclude reëmulsification; and drawing off from the fibrous matter the supernatant lighter liquid carrying the relatively heavier foreign matter.

In testimony whereof we have affixed our signatures in presence of two witnesses.

JOHANNES J. WERST.
PAUL M. H. L. COLLÉE.
JOHAN M. EGMOND.

Witnesses:
J. DE LANGL,
WILHELM CURTLY.